US009488278B2

(12) United States Patent
Nosenzo et al.

(10) Patent No.: US 9,488,278 B2
(45) Date of Patent: Nov. 8, 2016

(54) STATIC SEALING DEVICE FOR WHEEL HUB ASSEMBLIES CONNECTED TO CONSTANT VELOCITY JOINTS

(75) Inventors: Fabio Nosenzo, Asti (IT); Vincenzo Ferraro, Chieri (IT)

(73) Assignee: AKTIEBOLAGET SKF, Gothenburg (SE)

(*) Notice: Subject to any disclaimer, the term of this patent is extended or adjusted under 35 U.S.C. 154(b) by 854 days.

(21) Appl. No.: 13/526,617

(22) Filed: Jun. 19, 2012

(65) Prior Publication Data

US 2013/0001885 A1    Jan. 3, 2013

(30) Foreign Application Priority Data

Jun. 29, 2011   (IT) .............................. TO2011A0573

(51) Int. Cl.
| | | |
|---|---|---|
| *F16J 15/32* | (2016.01) | |
| *F16C 33/76* | (2006.01) | |
| *F16C 33/78* | (2006.01) | |
| *F16C 19/18* | (2006.01) | |

(52) U.S. Cl.
CPC .......... *F16J 15/3256* (2013.01); *F16C 33/768* (2013.01); *F16C 33/7883* (2013.01); *F16J 15/3264* (2013.01); *F16C 19/184* (2013.01); *F16C 2326/02* (2013.01)

(58) Field of Classification Search
CPC .............. F16C 33/768; F16C 33/7879; F16C 33/7883; F16C 33/7886; F16C 33/7896; F16C 2326/02; F16J 15/3256; F16J 15/3264
USPC ........ 384/484, 486, 544, 448; 277/500, 551, 277/577, 925
See application file for complete search history.

(56) References Cited

U.S. PATENT DOCUMENTS

| | | | | | |
|---|---|---|---|---|---|
| 4,960,335 | A | * | 10/1990 | Otto et al. .................... | 384/484 |
| 6,637,754 | B1 | * | 10/2003 | Ohtsuki et al. ............... | 277/549 |
| 8,100,775 | B2 | * | 1/2012 | Hirai et al. ................... | 464/178 |
| 8,210,752 | B2 | * | 7/2012 | Kamikawa et al. .......... | 384/544 |
| 2006/0125189 | A1 | * | 6/2006 | Peschke ............... | F16C 21/005 |
| | | | | | 277/349 |
| 2009/0097792 | A1 | * | 4/2009 | Kamikawa et al. .......... | 384/448 |
| 2011/0170817 | A1 | * | 7/2011 | Niebling et al. .............. | 384/445 |

FOREIGN PATENT DOCUMENTS

| | | | | | |
|---|---|---|---|---|---|
| DE | WO 2010040651 | A1 | * | 4/2010 | ......... B60B 27/0005 |
| EP | 2042755 | A2 | | 1/2009 | |

(Continued)

*Primary Examiner* — Vishal Patel
*Assistant Examiner* — Stacy Warren
(74) *Attorney, Agent, or Firm* — Bryan Peckjian; SKF USA Inc. Patent Dept.

(57) ABSTRACT

A static sealing device for a wheel hub comprising an inner ring associated with an outer ring of a constant velocity joint coupled with the wheel hub. A first sealing assembly is integrated between the inner ring and an outer ring of the wheel hub to protect respective rolling bodies. A second sealing assembly is integrated between the wheel hub and the outer ring of the joint. The first sealing assembly includes a shield fitted to the inner ring with a sleeve portion thereof and a flange portion extending towards the joint carrying an annular signal generating element and a tubular support element which projects axially from the flange portion. The second sealing assembly includes a tubular core having opposite ends embedded in an elastomeric material forming a sealing lip towards the joint and an elastically deformable annular tooth for engaging with a complimentary feature of the tubular support element.

11 Claims, 3 Drawing Sheets

(56) References Cited

FOREIGN PATENT DOCUMENTS

| EP | 2042755 | A2 | 4/2009 |
|----|---------|----|--------|
| WO | WO2008/006339 | A1 | 1/2008 |
| WO | WO2008006339 | A1 | 1/2008 |
| WO | WO2009/140996 | A1 | 11/2009 |
| WO | WO2009140996 | A1 | 11/2009 |

* cited by examiner

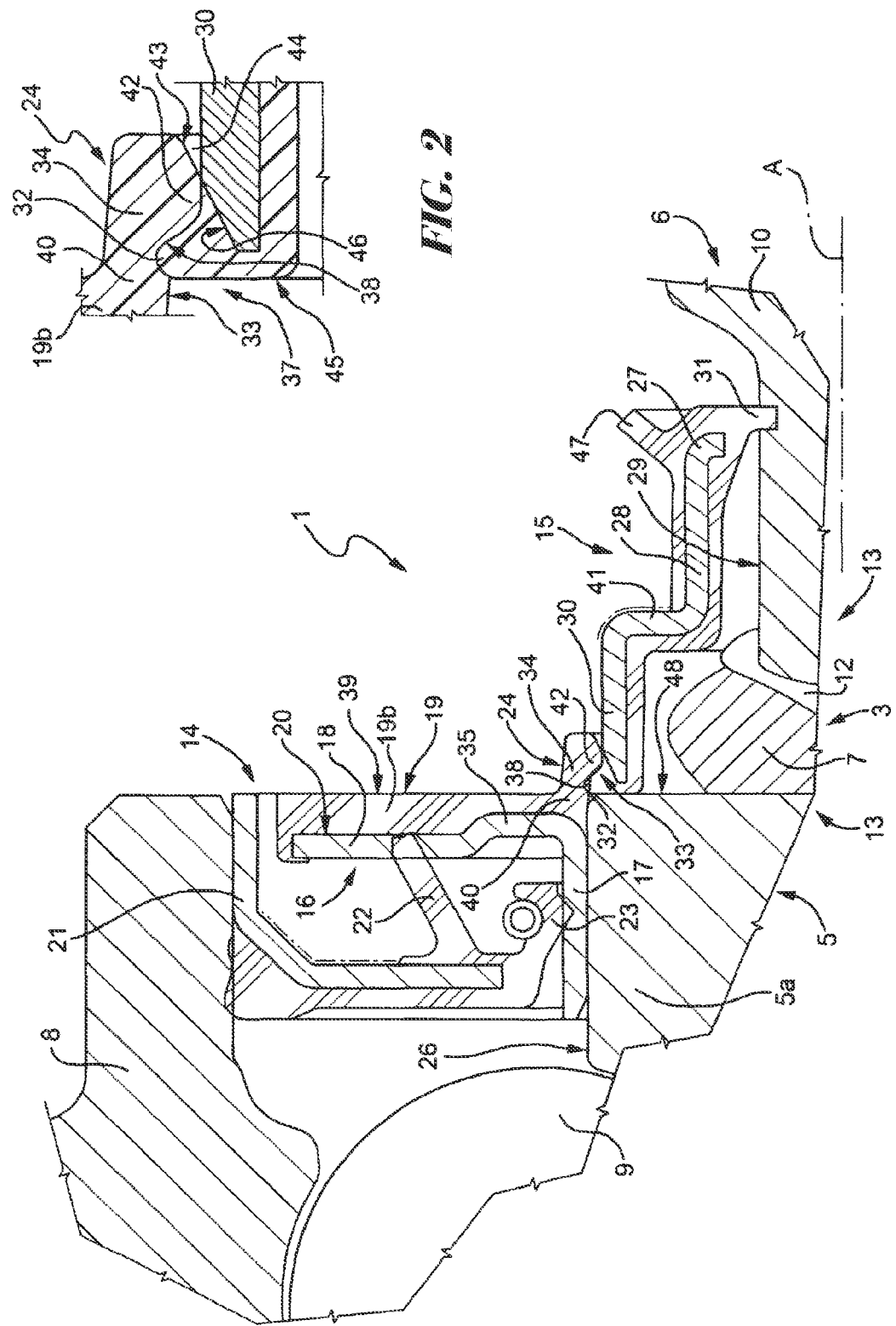

STATIC SEALING DEVICE FOR WHEEL HUB ASSEMBLIES CONNECTED TO CONSTANT VELOCITY JOINTS

CROSS-REFERENCE TO RELATED APPLICATION

This United States Non-Provisional Utility application claims the benefit of copending Italian Provisional Patent Application Serial No. TO2011A000573, filed on 29 Jun., 2011, which is incorporated herein in its entirety.

FIELD OF THE INVENTION

The present invention relates to a static sealing device for wheel hub assemblies connected to constant velocity joints, such sealing device being mountable in a simple and versatile way.

BACKGROUND OF THE INVENTION

Wheel hub assemblies support a vehicle wheel on one side and if the wheel is driving, they are angularly connected to a relative constant velocity joint for transmitting the driving torque from the axle shaft to the wheel itself. Wheel hub assemblies have an axis A of rotation and comprise an inner ring and an outer ring coaxial to each other and to axis A of rotation and rotatable with respect to each other by the arrangement of a crown of rolling bodies therebetween.

The inner ring is a flanged inner ring for allowing a wheel to be attached to the assembly and comprises:

a flange crosswise axis A of rotation, an axle extending along axis A of rotation and made integral with and of the same material as the flange, and an insert ring, which is axially mounted on the axle on the side opposite to the flange with respect to the axle itself, and is axially locked against a shoulder of the axle by a rolled edge.

The transmission of the driving torque from the constant velocity joint to the wheel hub is ensured by conjugate motion transmission toothed means provided on the adjacent and facing ends of the wheel hub and of the outer ring of the constant velocity joint; the toothed means may consist of a typical splined coupling or a pair of front toothings that couple to each other head to head, as shown in WO2009/140996, in EP2042755, or again in WO2008/006339.

In particular, in the case of provision of front toothings, the junction zone between wheel hub and constant velocity joint must be protected against infiltrations of external contaminants (water, dust, mud, dirt); the same applies to the rolling bodies mounted arranged between the inner ring and the outer ring which is provided with the fixing means to the suspension upright.

Such protection is obtained according to WO2008/006339 by a single sealing assembly made of two opposite shields, a first one fixed onto the inner ring of the bearing, on the side facing the constant velocity joint, and a second one fixed to the outer ring of the bearing and carrying a sealing ring provided with one or more sliding lips which cooperate in contact with the first shield. The first shield has a complex shape obtained by a dual fold, so that a sleeve portion thereof extends so as to protrude from the inner ring of the bearing and towards the outer ring of the constant velocity joint, covering the junction zone. This protruding portion may be provided, at least at the free end thereof, with an annular seal which frontally cooperates with the outer ring of the constant velocity joint; moreover, the protruding portion or the face of a flange portion of the first shield, facing in use the constant velocity joint, may be provided with an annular signal generating element (also called "phonic wheel") consisting, if the shield is made of a ferromagnetic metal material, of an alternation of projections and depressions, or of an annular sealing portion made of a magnetizable elastomeric material, magnetized so as to have an alternation of magnetized and non-magnetized zones, or of zones having opposite polarities. Once in use coupled with a suitable sensor, the rotation of the "phonic wheel", which according to what said is integral with the inner bearing ring, generates a signal that serves for detecting the rotation speed of the vehicle wheel.

The solution according to WO2008/006339 is expensive, complex to manufacture and produces large overall dimensions, both in radial and in axial directions.

In the case of WO2009/140996, the first shield has a simple L-shape in radial section and carries the signal generating element on the flange portion thereof; the protection of the junction zone is carried out by a second sealing assembly, separate from and adjacent to the sealing assembly arranged to protect the rolling bodies, mounted fitted, through a tubular core thereof, onto the outer lateral surface of the inner bearing ring; at the free end thereof, the tubular core carries an annular sleeve seal which makes a radial seal on the outer ring of the joint. This solution greatly increases the axial dimensions of the bearing since the inner ring of the same must be made adequately long for allowing the separate fitting of both sealing assemblies. Moreover, in order to obtain the fitting of the second sealing assembly it is preferable to have a shoulder available to the same whereon the thrust required in the mounting step is exerted. This should be obtained on the core towards the zone of the free end thereof, at the end of the fitting zone on the inner ring which is therefore subject to peak load in the mounting step and may easily get deformed.

The object of the present invention is to provide a static sealing device for wheel hub assemblies connected to constant velocity joints which is free from the above drawbacks, having low costs and high ease of manufacture, high protection efficiency on the rolling bodies and the coupling zone between joint and wheel hub and reduced axial and radial dimensions.

SUMMARY OF THE INVENTION

A static sealing device for wheel hub assemblies connected to constant velocity joints is thus provided according to the invention.

In a first aspect of the invention a static seal device for wheel hubs connected to constant velocity joints comprising:

a first sealing assembly interposed in use between an outer ring and a radially outer, cylindrical lateral surface of an inner ring of the wheel hub; and a second sealing assembly arranged in use between the wheel hub and an outer ring of the constant velocity joint, wherein the first sealing assembly comprises a first shield anchored to the inner ring by means of a sleeve portion fitted onto the radially outer, cylindrical lateral surface and provided, on the side of the joint, with a flange portion which radially extends so as to protrude from the sleeve portion and towards the outer ring of the wheel hub; wherein, in combination:

the first sealing assembly comprises a tubular support element which axially projects so as to protrude from the flange portion and, in use, from the inner ring; and the second sealing assembly comprises a tubular core having first and second opposite ends at least partially embedded in an elastomeric material forming, at the first end facing the side opposite to the first sealing assembly, at least one annular sealing lip sealingly cooperating with the outer ring of the joint; and, at the second end facing the first sealing assembly, an elastically deformable annular tooth for coupling to the tubular support element;

the tubular support element has, on the side of a lateral surface thereof, a shape complementary to a shape of the tooth so as to snappingly receive the tooth to axially restrain the second sealing assembly to the first sealing assembly and therefore to the inner ring of the wheel hub.

A compact overall device structure is thus obtained, with reduced axial and radial dimensions, easy to manufacture and to assembly, without subjecting the device parts to peak load, which parts moreover can be kept within reasonable axial length limits. An excellent fluid seal is equally obtained in the adjacent zones of the joint and of the wheel hub as well as the possibility of mounting the sealing device according to the invention in two times, which facilitates the assembly of the wheel hub assembly allowing the rolling bodies to be protected during the various assembly processing steps.

BRIEF DESCRIPTION OF THE DRAWINGS

Further features and advantages of the present invention will be apparent from the following description of non-limiting embodiments thereof, made with reference to the figures in the accompanying drawings, wherein:

FIG. 1 schematically shows a longitudinal elevation radial section view of a static sealing device according to the invention applied to a wheel hub assembly connected to a constant velocity joint, only partially shown for the sake of simplicity;

FIG. 2 schematically shows a radial section reduced scale view of a detail of a variant of the sealing device in FIG. 1.

DETAILED DESCRIPTION OF THE INVENTION

Figure 3:
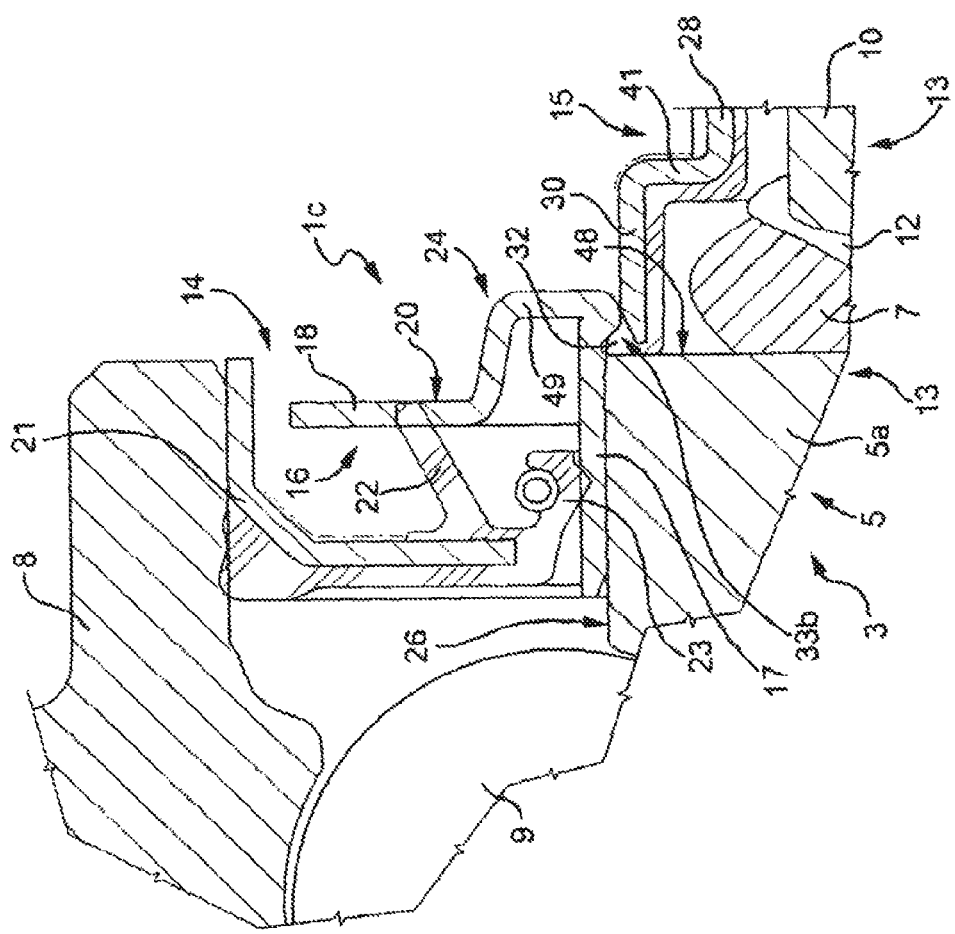
FIGS. 3 and 4 schematically show a longitudinal elevation radial section view of an identical detail of two possible construction versions of the static sealing device in FIG. 1 applied to a wheel hub assembly of the type shown in FIG. 1, only partially shown for the sake of simplicity.

With reference to FIGS. 1 and 2, reference numeral 1 (FIG. 1) globally denotes a static sealing device for a wheel hub 3 having axis A of rotation and of symmetry. The wheel hub 3 comprises an inner ring 5 which is operatively associated with a constant velocity joint 6, only partially shown for the sake of simplicity, for rotating integrally therewith.

The wheel hub assembly 3 further comprises an outer ring 8 mounted coaxial and concentric with ring 5, radially on the outside of ring 5, and a plurality of rolling bodies 9 arranged between rings 5 and 8. The inner ring 5 comprises a so-called "insert" ring 5a, made as an independent element axially locked by a rolled edge 7 and externally delimited by a cylindrical outer lateral surface 26, while the constant velocity joint 6 comprises an outer ring 10 provided with a cylindrical outer lateral surface 29 and with a front toothing 12 which engages with a similar front toothing, not shown for the sake of simplicity, obtained on the edge 7 on reciprocally adjacent portions 13 (FIG. 1) of the rings 5 and 10.

The device 1 comprises a first sealing assembly 14 arranged between the inner ring 5 (in particular ring 5a) and the outer ring 8 to protect the rolling bodies 9, and a second sealing assembly 15 integrally restrained, as shall be seen, to the inner ring 5 (in particular the ring 5a), arranged between the wheel hub 3 and the outer ring 10 of the joint 6, partially fitted on the surface 29. The sealing assemblies 14 and 15 are symmetrical and coaxial with respect to axis A.

The sealing assembly 14 comprises: two shields 16 and 21 arranged facing each other and fitted on the inner ring 5 (in particular 5a) and onto the inner ring 8, respectively; and a plurality of annular lips 22, 23 integral with the shield 21 and arranged in sliding contact with the shield 16.

The shield 16 is L-shaped in radial section and in turn comprises a sleeve portion 17 anchored/fitted by interference and therefore, fluid-sealingly, onto the radially outer lateral surface 26 of the inner ring 5, and a flange portion 18, which radially extends so as to protrude on the outside from the sleeve portion 17 and towards the outer ring 8.

On a respective frontal surface 20 thereof facing towards joint 6, the flange portion 18 supports an annular signal generating element 19 defined by a flat annular insert 19b, having predetermined thickness measured in axial direction, of a magnetizable elastomeric material which has been magnetized and anchored to the frontal surface 20 so as to wholly cover it. The annular insert 19b has either a plurality of magnetized and non magnetized zones alternating with each other about axis A, or a plurality of magnetized zones with opposite polarity; once the annular element or insert 19b is operatively coupled with a sensor, known and not shown for the sake of simplicity, such sensor emits a signal function of the rotation speed of ring 5.

According to the invention, on the side opposite to the sleeve portion 17 and on the side of the annular signal generating element 19, therefore in use towards the joint 6, the flange portion 18 carries a tubular support element 24 which axially projects so as to protrude from the flange portion 18 and, in use, from the inner ring 5 (in particular 5a).

Radially inwards, the tubular element 24 is arranged substantially flushed with the sleeve portion 17 of the shield 16 and therefore, substantially flushed with the radially outer cylindrical lateral surface 26 of the inner ring 5.

In combination with the above-described feature, the second sealing assembly 15 comprises a tubular core 28, opposite ends 27, 30 of which are at least partially embedded in an elastomeric material forming, at the first end 27 facing the side opposite to the first sealing assembly 14, at least one annular sealing lip 31 sealingly cooperating with the outer ring 10 of the joint 6; and, at the second end 30 facing the first sealing assembly 14, an elastically deformable annular tooth 32 for coupling to the tubular element 24.

Moreover, in combination again with what described above, the tubular support element 24 has, on the side of a radially inner lateral surface 33 thereof, a shape complementary to that of tooth 32 so as to snappingly receive it therein, to axially restrain in a protruding manner the second sealing assembly 15 to the first sealing assembly 14 and therefore to the inner ring 5 of the wheel hub 3.

The tooth 32 of elastomeric material wherein the second end 30 of the core 15 is embedded and the inner lateral surface 33 of the tubular element 24 are shaped so that in use, the tooth 32 frontally abuts against the inner ring 5 (in particular against the ring 5a), substantially in correspondence with the radially outer lateral surface 26.

According to a feature of the invention, the tubular support element 24 consists of a tubular sleeve 34 made of an elastomeric material, which axially projects so as to protrude from the annular signal generating element 19. In particular, the sleeve 34 is obtained integral with the annular signal generating element 19, therefore integral with the insert 19b of elastomeric material, through which the tubular support element 24 defined by the sleeve 34 is anchored integral to the flange portion 18.

Preferably, the tubular sleeve 34 made of elastomeric material forming the tubular support element 24 has a thickness, measured in the radial direction, which is substantially equal to the thickness of the sleeve portion 17 of the shield 16, so as to form a protruding extension thereof on the side of the frontal surface 20.

Also in order to improve the mechanical features of the snapping coupling between tooth 32 and sleeve 34, the flange portion 18 of the shield 16 may have, substantially at the sleeve portion 17, an annular bulge 35 defined by a U-shaped fold of the flange portion 18, and extending with the convexity thereof towards the tubular support sleeve 34; it therefore has the concavity thereof facing shield 21.

In order to optimize the snapping coupling between the sealing assembly 15 and the shield 16, the radially inner lateral surface 33 of sleeve 34 (FIG. 2) is provided, at a first end 37 thereof closer to the flange portion 18, with an annular indentation 38 obtained substantially flushed with, but on a side opposite to, a frontal outer surface 39 of the annular signal generating element 19, arranged parallel to the frontal surface 20.

In this way, the annular indentation 38 creates, on one side, a preferential radial bending zone on the tubular support element 24 corresponding to a thinned root portion 40 of the protruding sleeve 34, which directly originates from the insert 19b, and on the other side it creates an annular receiving seat for the elastically deformable tooth 32, consisting of the indentation 38 itself.

Moreover, the lateral surface 33 is also provided with an annular rim 42 obtained at one second end 43 thereof, opposite to the first end 37; the rim 42 extends to a position which is immediately adjacent to the indentation 38 and has, in the radial section, a convex curved profile which is seamlessly joined to a corresponding concave curved profile of the indentation 38, whereby the lateral surface 33 has a substantially upturned S profile in radial section.

Moreover, the profile of the annular rim 42 defines, on the side opposite to the flange portion 18 and therefore at the end 43, an inlet opening 44 of the tubular element 24 (FIG. 2) flared towards the joint 6, adapted to define an invitation for the insertion in the sleeve 34 of the tooth 32 of elastomeric material of the second sealing assembly 15.

According to a further aspect of the invention, tooth 32 of elastomeric material is delimited towards the first sealing assembly 14 by a front flat surface 45 arranged perpendicularly to the longitudinal symmetry axis A of the device 1 and adapted to abuttingly couple, with the tooth 32 engaged in the indentation 38, with the frontal end surface of the ring 5 (in particular ring 5a), which thus forms an axial support shoulder 48 for the tooth 32, a shoulder that is integral with the flange portion 18.

Moreover, the tooth 32 is shaped so as to partially project, on the side of the surface 45, axially protruding from the second end 30 of the tubular core 15, so as to improve its elastic deformability in the coupling step, without impairing the coupling sturdiness, once the same coupling has been made.

Also to this end, the end 30 of the core 15 is delimited towards the tooth 32 by a frustoconical annular surface 46 which, when the first sealing assembly 14 and the second sealing assembly 15 are coupled, is substantially tangent to the flared inlet opening 44 of the tubular support element 24.

In order to improve the axial stiffness of the core 28 and provide a thrust surface to carry out the snapping mounting of the sealing assembly 15 on the shield 16, the core 28 is provided, substantially at the centre between the ends 27 and 30, with a step-shaped portion 41, obtained by an L-fold of the tubular core 28. On the side of the end 27, moreover, the sealing assembly 15 is provided, in addition to the elastically deformable sliding sealing lip 31, with a second lip 47 shaped so as to be relatively stiff and which extends slanting so as to protrude from the end 27 on the side opposite to the lip 31, so as to form in use a centrifugation element for any contaminants that approach the lip 31.

Due to the provision of the tubular element 24 and to the described shape of the sealing assembly 15, the sealing assembly 15 may be made as an element independent of the sealing assembly 14 and in particular, of the shield 16, although being in use integrally retrained to the shield 16, axially protruding from the shield 16, as if obtained integrally therewith, above all by a simple snapping coupling, facilitated by the described shape of the rim 42.

Therefore, it is possible to pre-mount the device 1 snappingly coupling the sealing assemblies 14 and 15 before mounting the sealing assembly 14 between the rings 5 and 8, as with the prior art devices, but with the advantage of preventing any risk of deformation of the core 28 and significantly reducing both the axial and the radial dimensions of the device 1, or according to an aspect of the invention, the device 1 may be mounted in two steps; by first mounting only the sealing assembly 14 between the rings 5 and 8, before carrying out the plastic deformation of the edge 7; in this way, the rolling bodies 9 are protected during all the processing steps of the wheel hub assembly 3/constant velocity joint 6; thereafter, by snappingly coupling the sealing assembly 15, after having fitted it on the side of the end 27 on surface 29, with the elastomeric sleeve 34 integrally carried by the shield 16.

Figure 4:
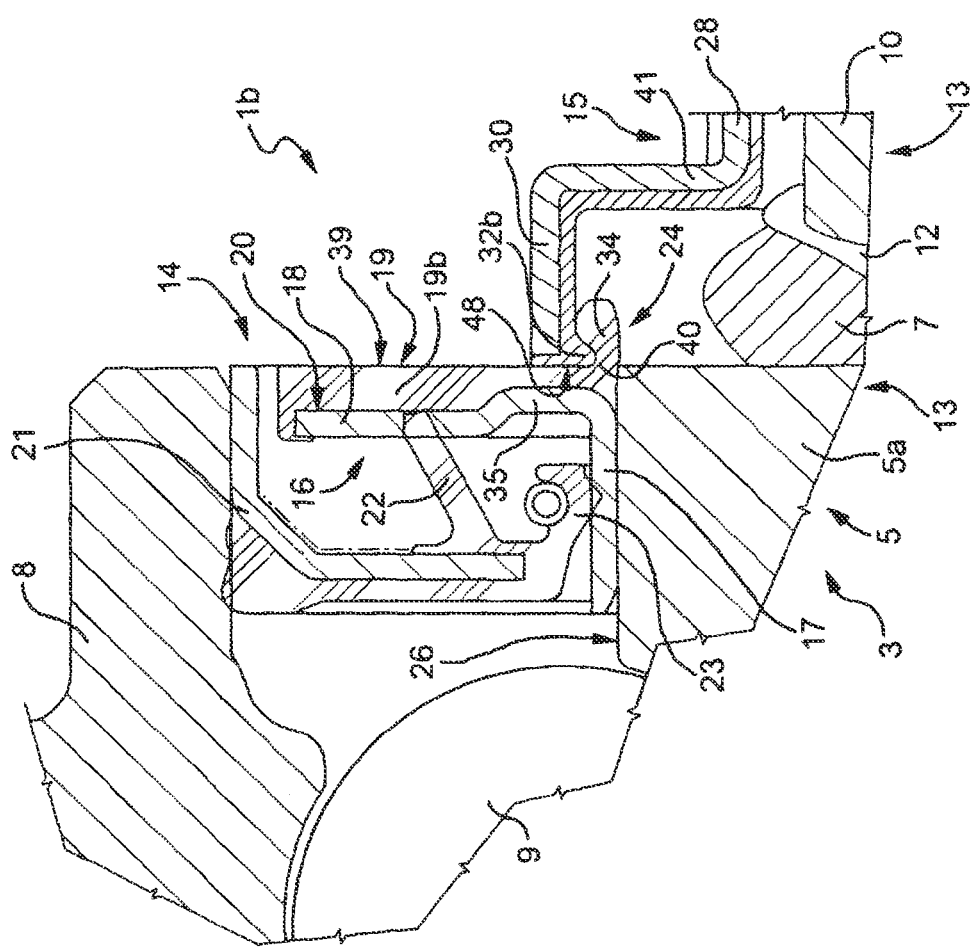

With reference now to the FIGS. 3 and 4, FIG. 4 shows a possible version 1b of the static sealing device in FIG. 1. Details similar or equal to those already described are indicated with the same reference numerals for the sake of simplicity.

In particular, the device 1b is identical to the device 1 described above, except in that it has a tooth 32b obtained so as to radially project protruding on the inside of the tubular core 28 (rather than on the outside), and in that the surface of the elastomeric sleeve 34 defining the tubular support element 24 according to the invention, adapted to couple with the tooth 32b, is a radially outer lateral surface 50 of the sleeve 34, rather than being the radially inner lateral surface 33, as in the case above. The profile of the surface 50 and of the tooth 32b are those described above for the surface 33 and the tooth 32, i.e. those in FIG. 2, but of course they are reversed by 180° with respect to axis A. In this case, the axial shoulder 48 for the tooth 32b is defined by the flange portion 18, rather than by the ring 5.

With reference to FIG. 3, it shows a version 1c of the static sealing device according to the invention, to be used if a signal generating element 19 is not required. The second sealing assembly 15 is identical to that described for the device 1 of FIGS. 1 and 2 and has a tooth 32 for engaging with the tubular support element 24. The latter, however, rather than consisting of a sleeve of elastomeric material as 34, consists of an annular bulged portion 49 of the first shield 16 defined by a U-shaped fold, in radial section, made at least on the flange portion 18 in order to axially project so as to protrude from the flange portion 18 on the side opposite to the sleeve portion 1; such U-shaped fold has the concavity facing the sleeve portion 17 and one of the opposite sides thereof, in particular the radially innermost one, defines a radially inner lateral surface 33b of the tubular element 24 having a shape complementary to the shape of the elastically deformable coupling tooth 32 carried by the tubular core 28.

The profile of the surface 33b is substantially identical to that described above for the surface 33 and in the practice is obtained by plastically deforming also a part of the sleeve portion 17 immediately adjacent to the flange portion 18; of course, moreover, according to this version, the sleeve portion 17 of the shield 16 has an axial length greater than that of the ring 5 (5a), so as to protrudingly project from the same, in use, on the side of the flange portion 18.

Finally, it should be noted that both embodiments of the invention shown in FIGS. 1 and 4 may also be carried out without the signal generating element 19, anchoring the elastomeric sleeve 32 or 32b directly onto the frontal surface or face 20 of the flange portion 18, also without the annular insert 19b, which may be totally lacking or only partially cover the face or surface 20 and in any case be obtained from a normal, non-magnetizable elastomeric material.

What we claim is:

1. A sealing device for a wheel hub connected to a constant velocity joint, the sealing device comprising:
    a first sealing assembly interposed in use between a wheel hub outer ring and a radially outer, cylindrical lateral surface of an inner ring of the wheel hub;
    a second sealing assembly arranged in use between the wheel hub and a constant velocity joint outer ring of the constant velocity joint, wherein the first and second sealing assemblies are separate components such that the second sealing assembly is not a one-piece member with the first sealing assembly,
    wherein the first sealing assembly comprises a first shield having a sleeve portion and a flange portion, the first shield being anchored directly to the inner ring by the sleeve portion fitted directly onto the radially outer, cylindrical lateral surface, the sleeve portion having a sleeve portion end facing the constant velocity joint with the flange portion located thereon, the flange portion radially extending so as to protrude from the sleeve portion and towards the wheel hub outer ring;
    the first sealing assembly comprises a tubular support element formed from an elastomeric material which axially projects so as to protrude from the flange portion and, in use, from the inner ring;
    the second sealing assembly comprises a tubular core comprising a first axially extending portion, a second axially extending portion, and a radially extending portion connecting the first and second axially extending portions, wherein the entirety of the tubular core is located radially inwardly from the radially outer, cylindrical lateral surface of the inner ring such that no portion of the first and second axially extending portions and the radially extending portion of the tubular core extend radially outwardly past the radially outer, cylindrical lateral surface of the inner ring, the tubular core having first and second tubular ends, the first tubular end facing away from the first sealing assembly and being at least partially embedded in an elastomeric material forming at least one annular sealing lip sealingly cooperating with the constant velocity joint outer ring; the second tubular end, opposite the first tubular end, being embedded in an elastomeric material that is configured to form a tooth for engaging the tubular support element, the inner ring of the wheel hub and the second sealing assembly being configured such that the tubular core cannot be directly secured in both axial directions by only the inner ring; and
    wherein the tubular support element extends axially past a radially extending axial end of the inner ring in a direction away from the inner ring such that at least a portion of the tubular support element does not radially overlap any part of the inner ring, the tubular support element has a tubular support shape complementary to a tooth shape of the tooth on the second tubular end of the tubular core so as to snappingly receive the tooth therein to axially restrain the second sealing assembly to the first sealing assembly and therefore to the inner ring of the wheel hub such that the tooth abuts and is axially sandwiched between the tubular support element and the radially extending axial end of the inner ring and such that no portion of the tubular core radially overlaps any part of the radially outer, cylindrical lateral surface of the inner ring.

2. A sealing device according to claim 1, wherein the second tubular end of the tubular core of the second sealing assembly is embedded in a material, and the tubular support element is shaped so that, in use, the tooth frontally abuts against the radially extending axial end of the inner ring which starts substantially flush with a radially extending surface of the tubular support element.

3. A sealing device according to claim 1, wherein the tubular support element consists of a tubular sleeve made of an elastomeric material, which axially projects so as to protrude from the flange portion, to which it is restrained, and which is arranged substantially flush with the sleeve portion and, therefore, substantially flush with the radially outer, cylindrical lateral surface of the inner ring.

4. A sealing device according to claim 3, wherein the flange portion of the first shield carries outwards and towards the constant velocity joint an annular signal generating element consisting of an insert, of predetermined thickness measured in the axial direction, made of a magnetizable elastomeric material, which has been anchored to a first frontal surface of the flange portion of the first shield facing the constant velocity joint, so as to completely cover the same; the tubular sleeve being formed of an elastomeric material and being integral with the annular signal generating element.

5. A sealing device according to claim 3, wherein the tubular sleeve made of elastomeric material forming the tubular support element has a thickness measured in the radial direction which is substantially equal to the thickness of the sleeve portion of the first shield, so as to form a protruding extension thereof on the side of a first frontal surface of the flange portion facing the constant velocity joint in use.

6. A device according to claim 3, wherein the flange portion of the first shield of the first sealing assembly has, substantially at the sleeve portion, an annular bulge defined by a U-shaped fold of the flange portion, and extending towards the tubular sleeve made of elastomeric material forming the tubular support element.

7. A sealing device according to claim 1, wherein a lateral surface of the tubular support element is provided, at a first end thereof which is closer to the flange portion of the first shield, with an annular indentation adapted to create, on one hand, a preferential radial bending zone on the tubular support element and, on the other hand, an annular receiving seat for the elastically deformable tooth of the second end of the tubular core of the second sealing assembly.

8. A sealing device according to claim 7, wherein the lateral surface of the tubular support element is provided with an annular rim extending to a position which is immediately adjacent to the indentation and having, when viewed in a radial cross section, a convex curved profile which is seamlessly joined to a corresponding concave curved profile of the indentation.

9. A device according to claim 8, wherein the convex curved profile of the annular rim defines, on the side opposite to the flange portion of the shield of the first sealing assembly, an inlet opening which is flared away from the tubular core.

10. A sealing device according to claim 9, wherein the tooth made of elastomeric material of the second sealing assembly is delimited towards the first sealing assembly by a front flat surface arranged perpendicularly to a longitudinal symmetry axis of the device and axially projects so as to partially protrude from the second end of the tubular core, which is delimited towards the tooth, when viewed in the radial cross section, by an annular, truncated-conical surface which, when the first and second sealing assemblies are coupled, is substantially parallel to the flared inlet opening of the tubular support element.

11. A sealing device for a wheel hub connected to a constant velocity joint, the sealing device comprising:
  a first sealing assembly interposed in use between a wheel hub outer ring and a radially outer, cylindrical lateral surface of an inner ring of the wheel hub;
  a second sealing assembly arranged in use between the wheel hub and a constant velocity joint outer ring of the constant velocity joint,
  wherein the first sealing assembly comprises a first shield having a sleeve portion and a flange portion, the first shield being anchored to the inner ring by the sleeve portion fitted onto the radially outer, cylindrical lateral surface, the sleeve portion having a sleeve portion end facing the constant velocity joint with the flange portion located thereon, the flange portion radially extending so as to protrude from the sleeve portion and towards the wheel hub outer ring;
  the first sealing assembly comprises a tubular support element which axially projects so as to protrude from the flange portion and, in use, from the inner ring;
  the second sealing assembly comprises a tubular core having first and second tubular ends, the first tubular end facing away from the first sealing assembly and being at least partially embedded in an elastomeric material forming at least one annular sealing lip sealingly cooperating with the constant velocity joint outer ring; the second tubular end, opposite the first tubular end, being configured to form a tooth for engaging the tubular support element, a lateral surface of the tubular support element is provided, at a first end thereof which is closer to the flange portion of the first shield, with an annular indentation adapted to create, on one hand, a preferential radial bending zone on the tubular support element and, on the other hand, an annular receiving seat for the elastically deformable tooth of the second end of the tubular core of the second sealing assembly, the lateral surface of the tubular support element is provided with an annular rim extending to a position which is immediately adjacent to the indentation and having, when viewed in a radial cross section, a convex curved profile which is seamlessly joined to a corresponding concave curved profile of the indentation, the convex curved profile of the annular rim defines, on the side opposite to the flange portion of the shield of the first sealing assembly, an inlet opening which is flared towards the tubular support element; the tooth made of elastomeric material of the second sealing assembly is delimited towards the first sealing assembly by a front flat surface arranged perpendicularly to a longitudinal symmetry axis of the device and axially projects so as to partially protrude from the second end of the tubular core, which is delimited towards the tooth, when viewed in the radial cross section, by an annular, truncated-conical surface which, when the first and second sealing assemblies are coupled, is substantially parallel to the flared inlet opening of the tubular support element; and
  wherein the tubular support element has a tubular support shape complementary to a tooth shape of the tooth on the second tubular end of the tubular core so as to snappingly receive the tooth to axially restrain the second sealing assembly to the first sealing assembly and therefore to the inner ring of the wheel hub.

\* \* \* \* \*